United States Patent [19]

Srinivasan et al.

[11] Patent Number: 6,025,050

[45] Date of Patent: *Feb. 15, 2000

[54] THERMALLY APPERTURED NONWOVEN LAMINATES FOR WIPES AND COVERSTOCK FOR HYGIENIC ARTICLES

[75] Inventors: Ramesh Srinivasan, North York, Canada; Angelo Colace, Walpole, Mass.

[73] Assignee: BBA Nonwovens Simpsonville, Inc., Simpsonville, S.C.

[*] Notice: This patent is subject to a terminal disclaimer.

[21] Appl. No.: 09/100,700

[22] Filed: Jun. 19, 1998

Related U.S. Application Data

[63] Continuation-in-part of application No. 08/705,208, Aug. 29, 1996, Pat. No. 5,851,935, and application No. 08/651,773, May 22, 1996, Pat. No. 5,830,555, which is a continuation-in-part of application No. 08/464,914, Jun. 5, 1995, Pat. No. 5,656,119, which is a division of application No. 08/260,126, Jun. 15, 1994, Pat. No. 5,567,501.

[51] Int. Cl.[7] ..................................... B32B 3/10
[52] U.S. Cl. .................. 428/137; 428/198; 428/286; 428/287; 442/328; 442/381; 442/392; 442/399; 604/365
[58] Field of Search ................................. 442/328, 381, 442/392, 399; 428/198, 137, 286, 287; 604/365

[56] References Cited

U.S. PATENT DOCUMENTS

| | | | |
|---|---|---|---|
| 453,564 | 6/1891 | Peterson | 101/23 |
| T875,026 | 6/1970 | Scharf | 250/325 |
| 1,002,842 | 9/1911 | Harriss | 19/54 |
| 1,707,400 | 4/1929 | Kerruish | 492/1 |
| 2,566,439 | 9/1951 | Beachler | 492/31 |
| 2,594,229 | 4/1952 | Snyder et al. | 428/220 |
| 2,705,686 | 4/1955 | Ness et al. | 428/148 |
| 2,705,692 | 4/1955 | Petterson | 428/113 |
| 2,998,341 | 8/1961 | Vaughan | 428/480 |
| 3,003,903 | 10/1961 | Vaughan | 428/220 |
| 3,221,738 | 12/1965 | Ekberg et al. | 604/366 |
| 3,325,331 | 6/1967 | Scheanekamp et al. | 156/290 |
| 3,485,708 | 12/1969 | Ballou et al. | 428/134 |
| 3,507,943 | 4/1970 | Such et al. | 264/103 |
| 3,542,634 | 11/1970 | Such et al. | 428/135 |
| 3,575,764 | 4/1971 | McFarren | 156/306.6 |
| 3,620,906 | 11/1971 | Hannes | 428/339 |
| 3,649,431 | 3/1972 | Parker | 428/137 |
| 3,678,933 | 7/1972 | Moore et al. | 604/366 |
| 3,695,967 | 10/1972 | Ross | 156/209 |
| 3,832,256 | 8/1974 | Kalwaites | 156/179 |
| 3,850,785 | 11/1974 | McQuade et al. | 442/2 |
| 3,913,510 | 10/1975 | Larsen | 112/410 |
| 3,925,127 | 12/1975 | Yoshioka | 428/101 |
| 4,107,364 | 8/1978 | Sisson | 428/196 |
| 4,184,902 | 1/1980 | Karami | 156/85 |
| 4,348,444 | 9/1982 | Craig | 428/137 |
| 4,355,066 | 10/1982 | Newman | 428/198 |
| 4,414,970 | 11/1983 | Berry | 602/75 |
| 4,446,189 | 5/1984 | Romanek | 128/152 |
| 4,469,735 | 9/1984 | Trokhan | 428/154 |
| 4,493,868 | 1/1985 | Meitner | 428/171 |
| 4,508,113 | 4/1985 | Malaney | 128/849 |
| 4,517,714 | 5/1985 | Sneed et al. | 28/103 |
| 4,522,203 | 6/1985 | Mays | 128/849 |
| 4,555,811 | 12/1985 | Shimalla | 2/51 |
| 4,573,991 | 3/1986 | Pieniak et al. | 604/385.2 |
| 4,588,630 | 5/1986 | Shimalla | 428/131 |
| 4,595,629 | 6/1986 | Mays | 442/364 |
| 4,606,964 | 8/1986 | Wideman | 428/152 |
| 4,692,368 | 9/1987 | Taylor et al. | 428/137 |
| 4,695,334 | 9/1987 | Mays | 156/62.2 |
| 4,722,857 | 2/1988 | Tomioka et al. | 428/113 |
| 4,725,473 | 2/1988 | Van Gompel et al. | 428/156 |
| 4,726,976 | 2/1988 | Karami et al. | 428/137 |
| 4,741,944 | 5/1988 | Jackson et al. | 428/152 |
| 4,756,786 | 7/1988 | Malaney | 156/308.2 |
| 4,758,297 | 7/1988 | Calligarich | 156/251 |
| 4,780,352 | 10/1988 | Palumbo | 428/138 |
| 4,781,962 | 11/1988 | Zamarippa et al. | 428/138 |
| 4,842,596 | 6/1989 | Kielpikowski et al. | 604/385.2 |
| 4,883,707 | 11/1989 | Newkirk | 428/219 |
| 5,002,815 | 3/1991 | Yamanaka et al. | 428/109 |

(List continued on next page.)

FOREIGN PATENT DOCUMENTS

| | | |
|---|---|---|
| 0 596 191 A1 | 5/1994 | European Pat. Off. . |
| WO-93-15247 | 8/1993 | WIPO . |
| WO-93-15248 | 8/1993 | WIPO . |
| WO-96-10979 | 4/1996 | WIPO . |

OTHER PUBLICATIONS

European Search Report for Application No. 95304071.4 dated Nov. 20, 1998.

*Primary Examiner*—Terrel Morris
*Assistant Examiner*—John J. Guarriello
*Attorney, Agent, or Firm*—Ostrager Chong Flaherty & Onofrio

[57] ABSTRACT

An apertured nonwoven laminate is produced by a thermal aperturing process by calendaring a carded web of fibers with a polymeric sheet having a lower melting temperature and a property of shrinking under application of heat and pressure so as to bond to the carded fibers and simultaneously pull back the carded fibers away from the calendering points to generate apertures through the nonwoven laminate. In a preferred apertured nonwoven product for baby wipes, a tri-laminate is formed with top and bottom layers containing polypropylene fibers or fiber blend with rayon fibers, and a middle (polymeric) layer of linear low density polyethylene (LLDPE) film material. The baby wipe product provides a significant cost advantage and an improved aesthetic appearance over conventional products. In a preferred apertured nonwoven product for coverstock for sanitary napkins, a film-fiber bi-laminate is formed with a high-open-area apertured top layer of LLDPE film material and a partially-apertured bottom layer including high tenacity, low elongation polypropylene fibers. An engraved calendar roll is used at the bottom side, while a cooler, smooth roll is used at the top side. The resulting bi-laminate has an apertured, smooth, and quilted appearance on the top side, and the bottom side is resilient and fibrous and acts as an excellent acquisition and distribution layer for the coverstock with low re-wet properties.

20 Claims, 5 Drawing Sheets

U.S. PATENT DOCUMENTS

| | | | |
|---|---|---|---|
| 5,030,302 | 7/1991 | Jud et al. | 156/164 |
| 5,178,706 | 1/1993 | Nishibara et al. | 156/229 |
| 5,185,052 | 2/1993 | Chappell et al. | 156/462 |
| 5,188,625 | 2/1993 | Van Iten et al. | 604/383 |
| 5,246,772 | 9/1993 | Manning | 442/364 |
| 5,281,209 | 1/1994 | Osborn, III et al. | 604/385.1 |
| 5,294,482 | 3/1994 | Gessner | 442/346 |
| 5,300,058 | 4/1994 | Goulait et al. | 604/391 |
| 5,330,461 | 7/1994 | Leeker | 604/385.2 |
| 5,334,446 | 8/1994 | Quantrille et al. | 442/35 |
| 5,344,416 | 9/1994 | Niihara | 604/385.1 |
| 5,354,400 | 10/1994 | Lavash et al. | 156/227 |
| 5,364,681 | 11/1994 | Pate et al. | 428/137 |
| 5,366,782 | 11/1994 | Curro et al. | 428/137 |
| 5,393,599 | 2/1995 | Quantrille et al. | 442/57 |
| 5,494,736 | 2/1996 | Willey | 442/409 |
| 5,567,501 | 10/1996 | Srinivasan et al. | 428/137 |
| 5,567,581 | 10/1996 | Srinivasan et al. | 428/137 |
| 5,628,097 | 5/1997 | Benson et al. | 210/198.2 |
| 5,851,935 | 12/1998 | Srinivasan et al. | 442/328 |

6,025,050

THERMALLY APERTURED NONWOVEN LAMINATES FOR WIPES AND COVERSTOCK FOR HYGIENIC ARTICLES

This patent application is a continuation-in-part of commonly owned U.S. patent application No. 08/705,208 of Srinivasan et al. filed on Aug. 29, 1996 now U.S. Pat. No. 5,851,935 and of commonly owned U.S. patent application No. 08/651,773 of Srinivasan et al. filed on May 22, 1996, now U.S. Pat. No. 5,830,555 which was a continuation-in-part of U.S. patent application 08/464,914 of Srinivasan et al. filed on Jun. 5, 1995, now U.S. Pat. No. 5,656,119 issued on Aug. 12, 1997, which was a divisional of Ser. No. 08/260,126 of Srinivasan et al. filed on Jun. 15, 1994, now U.S. Pat. No. 5,567,501 issued on Oct. 22, 1996.

FIELD OF THE INVENTION

This invention relates generally to apertured nonwoven fabrics and, particularly, to apertured nonwoven wipes and coverstock formed by a thermal aperturing process.

BACKGROUND ART

Apertured nonwoven fabrics are used in environments where it is desired to combine the properties of a fluid pervious outer layer for contact with the skin of a user with an absorbent layer having fluid absorption capacity. Such apertured nonwoven fabrics find use as a topsheet in diapers, sanitary napkins, adult incontinence products, and other hygienic products.

Traditionally, apertured nonwoven fabrics are formed by hydraulic processes such as hydroentangling a fibrous web with an apertured pattern or spunlacing, by mechanical processes such as perforating or punching a nonwoven fabric, or by thermo-mechanical processes such as hot pin perforation, etc. Hydraulic processes require rather costly equipment and complex processing operations. Mechanical or thermo-mechanical processes also require multiple processing steps, e.g., by first forming a bonded nonwoven fabric then perforating or aperturing the same.

Some thermo-mechanical processes, such as taught in U.S. Pat. Nos. 3,507,943 and 3,542,634, can bond and aperture a fibrous layer in one step by pressure fusing the fibers of the nonwoven layer between contact points of embossed rolls or land-groove rolls and at the same time forming apertures therethrough by melting with sufficient heat and pressure, shearing action, etc. However, a high amount of heat and pressure is required to produce well-formed through-holes in the nonwoven layer. Other processes, such as taught in U.S. Pat. No. 4,780,352 to Palumbo, form a topsheet in one processing step by perforating a fluid-pervious nonwoven layer with a plastic intermediate layer.

It is therefore a principal object of the present invention to produce an apertured nonwoven laminate through a one-step cost-effective process using a simplified technique for generating apertures of sufficient size and shape. It is a particular object that such process take advantage of a physical interaction between polymeric materials of different melting temperatures under application of heat and pressure from the calendering points of a calender roll to accomplish simultaneous bonding of the fibers and forming of apertures through the nonwoven fabric.

It is a particular object of the invention to produce apertured nonwoven laminates usable for wipes and coverstock for hygienic articles which can provide a substantial cost advantage over conventional products and which have an aesthetic appearance desirable to users.

SUMMARY OF THE INVENTION

In accordance with the present invention, an apertured nonwoven laminate is produced by a thermal aperturing process by calendaring a carded web of fibers having a higher melting temperature and a polymeric sheet having a lower melting temperature and a property of shrinking under application of heat and pressure applied through calendering points of a calender roll, such that the melted polymeric sheet becomes bonded to the carded fibers and simultaneously shrinks and pulls back the carded fibers away from the calendering points, thereby generating apertures completely through the nonwoven fabric.

In a preferred apertured nonwoven fabric for baby wipes, a tri-laminate fabric is formed with top and bottom layers containing carded polypropylene fibers or fiber blend and rayon fibers, and a middle (polymeric) layer of linear low density polyethylene (LLDPE) film material. A layered product having different fiber compositions in the top and bottom layers also obtained good results. Calendaring the laminate with top and bottom engraved calendar rolls producing a 25% bond area provided an 85% reduction in fuzz generation, as compared to using one engraved calendar roll and a smooth opposing roll.

In a preferred apertured nonwoven laminate for coverstock used as a topsheet for sanitary napkins, a bi-laminate film-fiber composite is formed with a high-open-area apertured top layer of LLDPE film material and a partially-apertured bottom layer of high tenacity, low elongation polypropylene fibers. The film material is selected to have a melting temperature at least 35° C. lower than the fibers of the bottom layer, and a property of shrinking suddenly so as to cause the fibers on the other side to move away from the nip points of the calendar rolls, thereby forming a partial aperture on the fibrous side and a complete aperture on the film side. An engraved calendar roll is used at the bottom side, while a smooth roll at a temperature at least 70° C. lower is used at the top side. The resulting bi-laminate has an apertured, smooth, and quilted appearance with 25% open area on the top side, and a bottom side that is resilient and fibrous and acts as an excellent acquisition and distribution layer for the coverstock.

Other objects, features and advantages of the present invention are described in further detail below in conjunction with the drawings, as follows:

DETAILED DESCRIPTION OF THE INVENTION

Figure 1A:
FIGS. 1a–1d illustrate the thermal aperturing technique for producing a preferred tri-laminate having outer nonwoven layers and intermediate polymeric layer.
Figure 1B:
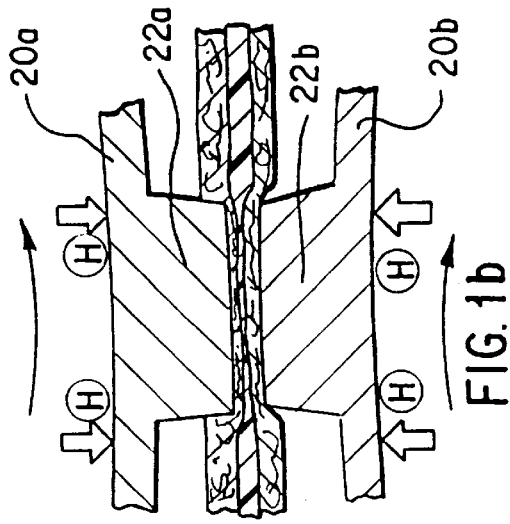

In the present invention, a one-step bonding and aperturing process is used for manufacturing an apertured nonwoven product using thermal bonding (i.e., heated calendering) technology. The apertured nonwoven product is produced by combining one or two carded web(s) of fibers with a polymeric sheet having a lower melting temperature and a property of shrinking when melted, such that under the application of heat and pressure the polymeric sheet becomes bonded to the carded web(s) and shrinks and pulls back the carded fibers to form apertures completely through the nonwoven fabric. The fusing and pulling back of the fibers by the melting/shrinking polymeric sheet is evident from the crusted ring of fused or congealed material surrounding the apertures and bonding the layers together.

The fibers of the carded web(s) are made of a polymeric material. Preferably, they are olefinic fibers such as polyethylene or polypropylene, and most preferably, high tenacity, low elongation polypropylene fibers. These types of polypropylene fibers are typically used in textile industries such as carpet manufacturing. They are brittle and move readily under the shrinking action of a polymeric film. Apertured nonwoven fabrics made from these fibers obtain the softness and extensibility (or drapeability) that is required in the absorbent products industry from the type of polymeric sheet employed, the presence of apertures in the fabric, and the temperature employed during processing. Desirable apertured nonwovens in accordance with the invention were obtained using low elongation, high tenacity polypropylene fibers, such as, for example, Herculon fibers (Hercules Corporation, Norcross, Ga.) designated T116, T117, T118, T101, T123, T124 and T142.

Such fibers differ significantly from fibers used in the manufacture of non-apertured nonwovens. Soft, drapeable non-apertured fabrics are typically made from standard polypropylene fibers having low tenacity and high elongation. For example, polypropylene fibers designated Herculon T190, T195, T186 and T196 have been used. However, these standard polypropylene fibers do not move readily under the shrinking action of a polymeric film and cannot form apertures. Table 1 compares the properties of 2.0 denier polypropylene fibers which will form apertures in the fabric of the invention versus fibers which will not. Table 2 compares properties of polypropylene fibers having denier greater than 3.0.

TABLE 2

| PROPERTIES | FIBERS THAT APERTURE | | | FIBERS THAT DO NOT APERTURE | |
|---|---|---|---|---|---|
|  | T142 | T117 | T101 | T196 | T186 |
| Dpf | 3.11 | 5.80 | 2.60 | 3.20 | 3.10 |
| Length (mm) | 38.00 | 38.00 | 38.00 | 38.00 | 38.00 |
| Tenacity (gpd) | 5.34 | 3.53 | 3.82 | 1.80 | 1.66 |
| Elongation (%) | 83.00 | 156.00 | 142.00 | 385.00 | 446.00 |
| Crimps/in. | 14.90 | 19.80 | 20.90 | 17.90 | 22.60 |
| Finish (%) | 0.83[1] | 0.54[2] | 0.90[1] | 0.87[2] | 0.67[3] |

[1]Regular Finish
[2]Hydrophilic Finish
[3]Durable Hydrophilic Finish

The polymeric sheet comprises a material which has a melting temperature at least 35° C. lower than the melting temperature of the fibers located in the outer carded web(s). Preferred polymeric sheets which may be used include, but are not limited to, olefinic films, and most preferably, linear low density polyethylene ("LLDPE") diaper backsheet films. Several examples of LLDPE films are shown in Table 3. The characteristics of preferred LLDPE films are shown in Table 4. These films are commercially available from several suppliers including, but not limited to, Exxon Chemical Company, Lake Zurich, Ill. The caliper of preferred films varies from 0.5 to 1.0 mil, most preferably 0.8 mil, and the corresponding weights vary from 11 to 21 gsy, preferably 17 gsy.

TABLE 3

| FILM COMPOSITION | EXAMPLE/ COMMON NAME | CALIPER (mils) | SUPPLIERS |
|---|---|---|---|
| Linear Low Density Polyethylene | EMP 610 or other diaper backsheet cast | 0.5, 0.75, 0.9, 1.0, | Exxon, Clopay, |

TABLE 1

| PROPERTIES | FIBERS THAT APERTURE | | | | | FIBERS THAT DO NOT APERTURE | | | |
|---|---|---|---|---|---|---|---|---|---|
|  | T116 | T117 | T118 | T123 | T101 | T150 | T195 | T196 | T186 |
| Dpf | 2.20 | 2.10 | 2.20 | 1.90 | 1.80 | 2.20 | 2.20 | 2.30 | 2.30 |
| Length (mm) | 38.0 | 38.0 | 38.0 | 38.0 | 38.0 | 38.0 | 38.0 | 38.0 | 38.0 |
| Tenacity (gpd) | 3.71 | 3.73 | 3.97 | 4.15 | 3.50 | 2.00 | 1.85 | 2.20 | n/a |
| Elongation (%) | 113.0 | 132.0 | 89.0 | 117.0 | 120.0 | 350.0 | 380.0 | 344.0 | 367.0 |
| Crimps/in. | 28.20 | 22.10 | 22.10 | 17.70 | 17.00 | 25.50 | 24.00 | 22.70 | 25.10 |
| Finish (%) | 0.75[1] | 0.71[2] | 0.28[3] | 0.53[4] | 0.55[1] | 0.30[3] | 0.22[3] | 0.57[2] | 0.79[5] |

[1]Regular Finish
[2]Hydrophilia Finish
[3]Hydrophobic Finish
[4]FDA Hydrophilic Finish
[5]Durable Hydrophilic Finish TABLE 3-continued

| FILM COMPOSITION | EXAMPLE/ COMMON NAME | CALIPER (mils) | SUPPLIERS |
|---|---|---|---|
| (LLDPE) | embossed films | 1.2 | Tredegar |
| LLDPE blended with ethyl vinyl acetate copolymer (LLDPE/EVA) | Proprietary | 1.0, 1.5 | Proprietary |
| LLDPE blended with polystyrene | RX20, RN30 Sanitary napkin film | 1.0–3.0, 10–50% open area | Smith & Nephew |
| Proprietary | Styrenic block copolymer based blown elastomeric films like Exx 553, Exx 560 | 1.6, 1.8, 2.0, 2.4, 3.0 | Exxon |
| Proprietary | Heat shrink, meat packaging film | 1.0–2.0 | DuPont, W.R. Grace |
| LLDPE | Shrink Wrap/Stretch Wrap/palletizing film | 0.6, 0.8, 1.0, 1.2, 1.5 | Mobil, AEP, Borden |
| Polypropylene | Flexible polyolefins/ soft polypropylene | Various | CT film, Rexene |
| Coextruded LLDPE films: (a) EVA on 1 side (b) EVA on 2 sides | Various | Various | Various |

TABLE 4

| Opacity | 44.10–58.50 |
|---|---|
| COF | 0.85–1.13 |
| MD tensile (psi) | 1,450.00–2,412.00 |
| MD elongation (%) | 490.00–538.00 |
| CD tensile (psi) | 871.00–2,388.00 |
| CD elongation (%) | 546.00–584.00 |

Other materials may also be used as the polymeric sheet, including, but not limited to, elastomeric, heat shrink and apertured plastic films, or in lieu of a film, a mix of low and high melt polypropylene and polyethylene fibers or polyproplylene/polyethylene bicomponent fibers can be used. Further, the apertured fabric of the invention may be formed as a bi-laminate or tri-laminate product. Where a plastic film is used, apertured fabric can be made one-sided or two-sided. When the plastic film is embedded between two layers of fiber, a product having either the same feel on both sides or having one soft side and one rough side is made, referred to herein as a "tri-laminate" product. On the other hand, attaching the plastic film to either side of the fiber layer results in a product having a different feel on its two sides. One side feels soft due to the presence of fibers, while the other side feels like plastic. This is referred to as a "bi-laminate" product.

For example, it is has been found that using LLDPE film as the polymeric sheet and embedding it between two layers of carded fibers produces a tri-laminate product with good aperture quality at the lowest cost. A desirable product can be made having a weight from 30 to 46 gsy using low-elongation, high tenacity polypropylene fibers for the carded webs, such as fibers designated T101 1.8 dpf×38 mm obtained from Hercules Corp., of Norcross, Ga., and 16 gsy clear stretch wrap film, such as Loadmaster-S, PC-3400, 1.0 mil, LLDPE stretch wrap film, from Borden Packaging and Industrial Products, of North Andover, Mass.

An apertured plastic film can be used in place of the LLDPE stretch wrap film. For example, apertured polyethylene films of different grades, thicknesses, and compositions with or without ethylvinyl acetate copolymer (EVA) can be used. The apertured film embedded between two layers of fibers results in a tri-laminate product with very good aperture quality, particularly for films containing an EVA copolymer. The product exhibits good uni-directional passage of fluid. A bi-laminate variation can also be made.

The thermal aperturing technique was also found to be adaptable to tri-laminate products having non-thermoplastic fibers, e.g., rayon for the carded webs, and a suitable plastic film in between. Good apertured products were obtained using 15 gsy Hercules T101 PP fiber in one layer and 15 gsy Courtaulds rayon (1.5 dpf×40 mm) fibers in the other layer, with LLDPE stretch wrap, LLDPE with EVA copolymer, and elastomeric styrenic block (SB) copolymer based films. A unique product having good to excellent aperture quality can be made with 15 gsy rayon fibers in both layers and an LLDPE with EVA copolymer or elastomeric styrenic block copolymer film in between. A product having excellent aperture quality can also be obtained with rayon fibers in both layers and a stretch wrap film in between if the calender roll temperature is increased substantially higher, e.g., 412° F. (instead of 320° F.). A product with excellent aperture quality can also be produced using the Hercules T101 PP fibers as the intermediate layer, but the resulting fabric has lower tensile strengths than when using plastic films.

Low denier polypropylene/polyethylene bi-component (PP/PE) fibers are also suitable for this thermal aperturing technique. The low melting polyethylene sheath in contrast to the higher melting polypropylene core acts similar to the thin olefinic film described above. In typical examples, cleanly apertured products were manufactured using Chisso ES 0.9 dpf×38 mm bi-component fibers obtained from the Chisso Company of Japan carded in two layers without any intermediate layer.

A similar variation exploits the same physical effect by blending fibers with higher and lower melting points. The melting point differential is selected to simulate the effect of the thin olefinic film in pulling back the fibers from the aperture areas. As an example, 20% of low melting polyethylene fiber can be blended with 80% polypropylene fibers to produce a suitable apertured product.

Elastic properties can be imparted to the apertured product by the use of an elastomeric film in place of the thin olefinic film. For example, an elastomeric film such as one designated Exx 560 obtainable from Exxon Chemicals Corp., of Lake Zurich, Ill., can produce a product of good aperture clarity and excellent elastic properties in both the machine and cross directions. Both tri- and bi-laminate products can be made.

Heat shrink films may also be used to obtain the same physical effect of shrinking and pulling back the fibers to form apertures through the nonwoven fabric. For example, low-melting high-shrink films obtained from Exxon Chemicals Corp. produced a product with good aperture quality. Another high shrink film, designated CLYSAR™, Grade #60LLP, from DuPont Corp., gave a unique, bulky, apertured fabric.

In general, the desired polymeric layer for use in this invention has the property of readily fusing to the fibers of the fibrous layer(s) and shrinking sharply under calendar heat and pressure so as to pull the fused fiber ends back away from the calendar points to form an aperture through the laminate. Preferred parameters for this heat fusing and shrinking property are as follows.

The polymeric layer should be chosen to have a melting temperature of at least 35° C. lower than the melting temperature of the fibers. For example, when using polypropylene fibers, a preferred polymeric material is a linear low density polyethylene film. The polymeric layer should also have a thickness of about 0.5 mils to 1.5 mils, preferably 0.8 mils. This range provides a polymeric layer which is thick enough to engage the fibers and pull them away (or shrink) from the calender points, but not too thick as to result in a fabric having a plastic feel (i.e., the fabric exhibits excellent drapeability and softness). when using an apertured film, the preferred thickness is 1.0 mils. Preferred apertured films comprise linear low density polyethylene blended with EVA or polystyrene.

An example of the general process for forming thermally apertured nonwoven laminate in accordance with the invention is illustrated in FIGS. 1a—1d using a film as the polymeric sheet. One or two outer carded web(s) 10a, 10b and a thin film 12 are fed in superposed relation through the nip of a pair of heated calender rolls 20a, 20b. When dual engraved calender rolls are used, the rolls have a matched plurality of calendering points or lands 22a, 22b which come together to apply heat and pressure to the superposed layers fed in between.

Figure 1C:
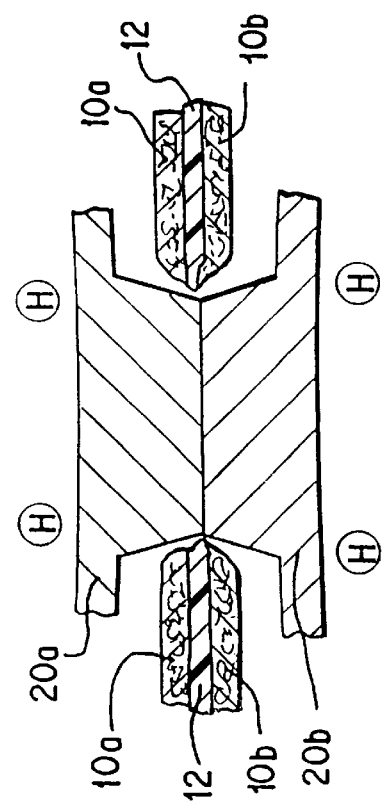
Figure 1D:
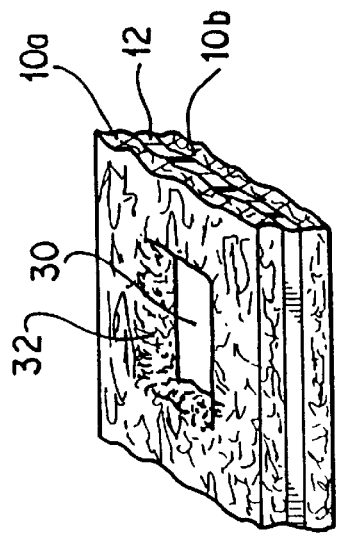

As shown in FIG. 1c, application of suitable heat and pressure causes the lower melting film 12 to melt and suddenly shrink away from the area of the calendering points 20a, 20b. While shrinking away, the melting film fuses to the fibers of the webs 10a, 10b and pulls the fibers back away from the calendering points 22a, 22b. As shown in FIG. 1d, the result is that the film 12 and the fibers of the carded webs 10a, 10b become fused to each other, forming a crusted ring of fused matter 32 around the area of the calendering points 22a, 22b. This crusted ring serves simultaneously to bond the layers together and to define an aperture 30 (or "through-hole") completely through all layers of the nonwoven fabric having a fused border along the periphery thereof. The film acts as a carrier to move the fibers away from the calendering points 22a, 22b and to create the aperture 30.

Figure 2:
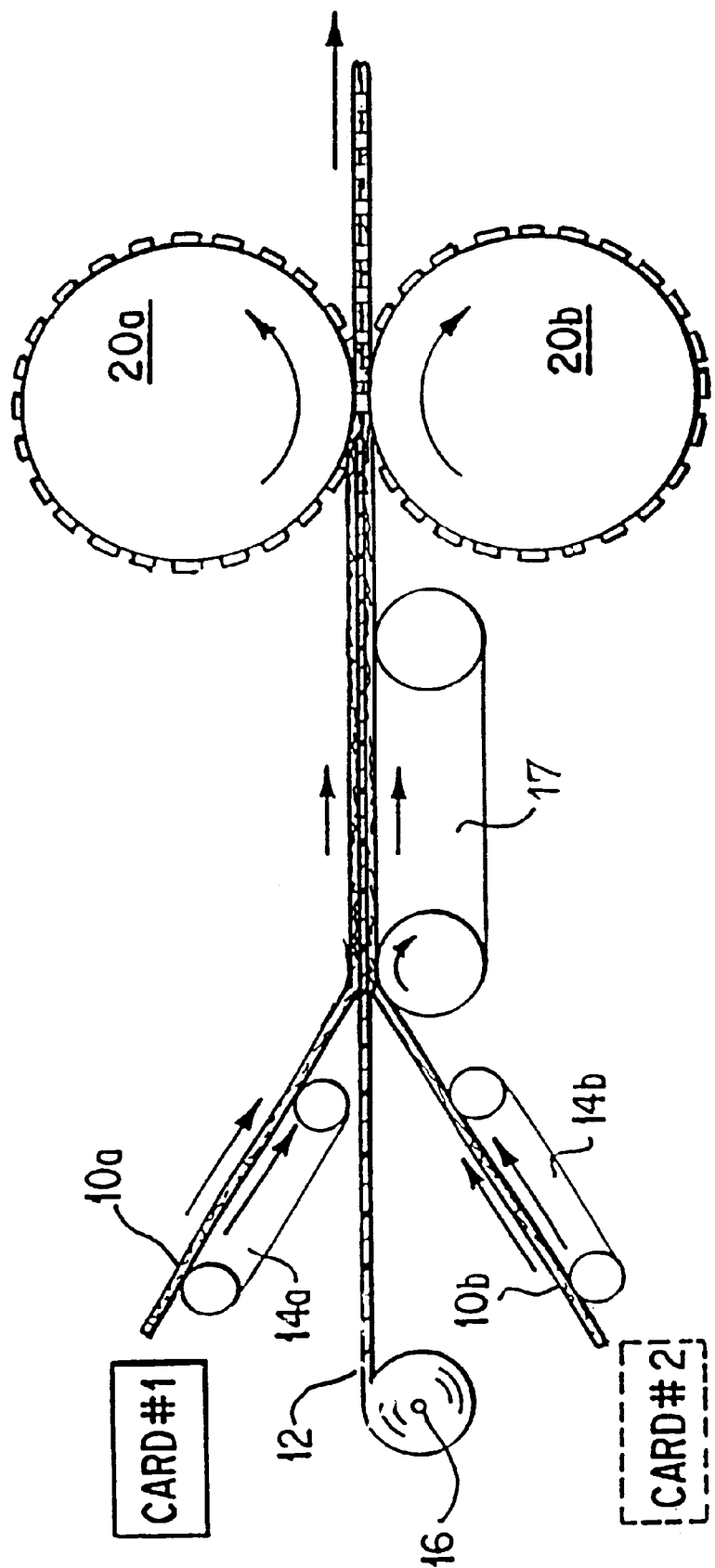
FIG. 2 is a schematic view of a process line using top and bottom engraved rolls for the manufacture of apertured nonwoven tri-laminates in the invention.

In FIG. 2, one type of preferred process line is shown schematically for the manufacture of apertured nonwoven tri-laminate as a continuous roll product. The fibers of the carded web(s) are carded at card stations #1 and #2 and fed on card conveyors 14a, 14b, respectively, to form the webs 10a, 10b of fibers. The thin film 12 is unwound from an unwind stand 16 and fed in superposed relation between the two carded webs on the card conveyors, and the composite of film enclosed between two carded webs is fed by conveyor 17 to hot calender rolls 20a, 20b to be thermally bonded and apertured. The calender rolls 20a, 20b are heated to a temperature of 200° F.–600° F., preferably 300° F.–400° F., and apply pressure in the range of 150–900 pounds per linear inch, preferably 300–600 pli. The carded webs and polymeric sheet are processed at a speed of 100–700 fpm, preferably 200–400 fpm.

Samples of the apertured nonwoven laminates of the invention were made using a pilot thermal bonding line with 10" width. Scaling up to a 32" wide line tested successfully. Pilot line speeds of up to 150 feet/minute were run without any problems. The use of stretch wrap film and LLDPE film with EVA copolymer embedded in PP fiber layers produced very good aperture quality, particularly at 32 gsy fabric weight. Calender roll temperatures of between 328° F. to 332° F. and calender pressures of 400–550 pli on the 10" line and 250–300 pli on the wider thermal bonding line were found to provide optimum results. Good aperture quality was obtained with calender rolls having the Novonette (diamond-shaped) pattern and land widths of 0.065" and 0.081", for percentage of apertured areas of 9% and 16%, respectively.

The preferred practice employs dual engraved rolls with the Novonette pattern, hence this process is referred to as the "Novonette Bonding Line". Alternatively, anvil rolls or even a single engraved roll have been successfully utilized. On entering the heated calender rolls, the olefinic fibers are bonded together and the film melts and shrinks away from the calendering points to generate a pattern of apertures. On exiting the calender rolls, the bonded and apertured nonwoven fabric is wound up on a roll.

The apertured product can be formed with typically 1–50% open (or apertured) area. However, the product can be tailored with any required open area (i.e., shape, size, open area %) by modifying the type of calender roll used, the calender bond pattern, process conditions, etc. For example, four types of apertures have been formed in our tests, including circular or oval, and three sizes (small, medium and large) of diamond shaped apertures. The apertured product can also be mechanically tentered (stretched) as it exits in a hot condition from the calender. Tentering can significantly enhance the aperture clarity and size.

A more detailed description of the above-described process line and the overall process for producing thermally apertured nonwoven products is provided in commonly owned U.S. Pat. No. 5,567,501 of Srinivasan et al. issued Oct. 22, 1996, in U.S. patent application Ser. No. 08/651,773 filed May 22, 1996, now U.S. Pat. No. 5,830,555 issued on Nov. 3, 1998, and in U.S. patent application Ser. No. 08/705,208 of Srinivasan et al. filed on Aug. 29, 1996, now U.S. Pat. No. 5,851,935 issued Dec. 22, 1998, all of which are incorporated herein by reference.

Figure 3:
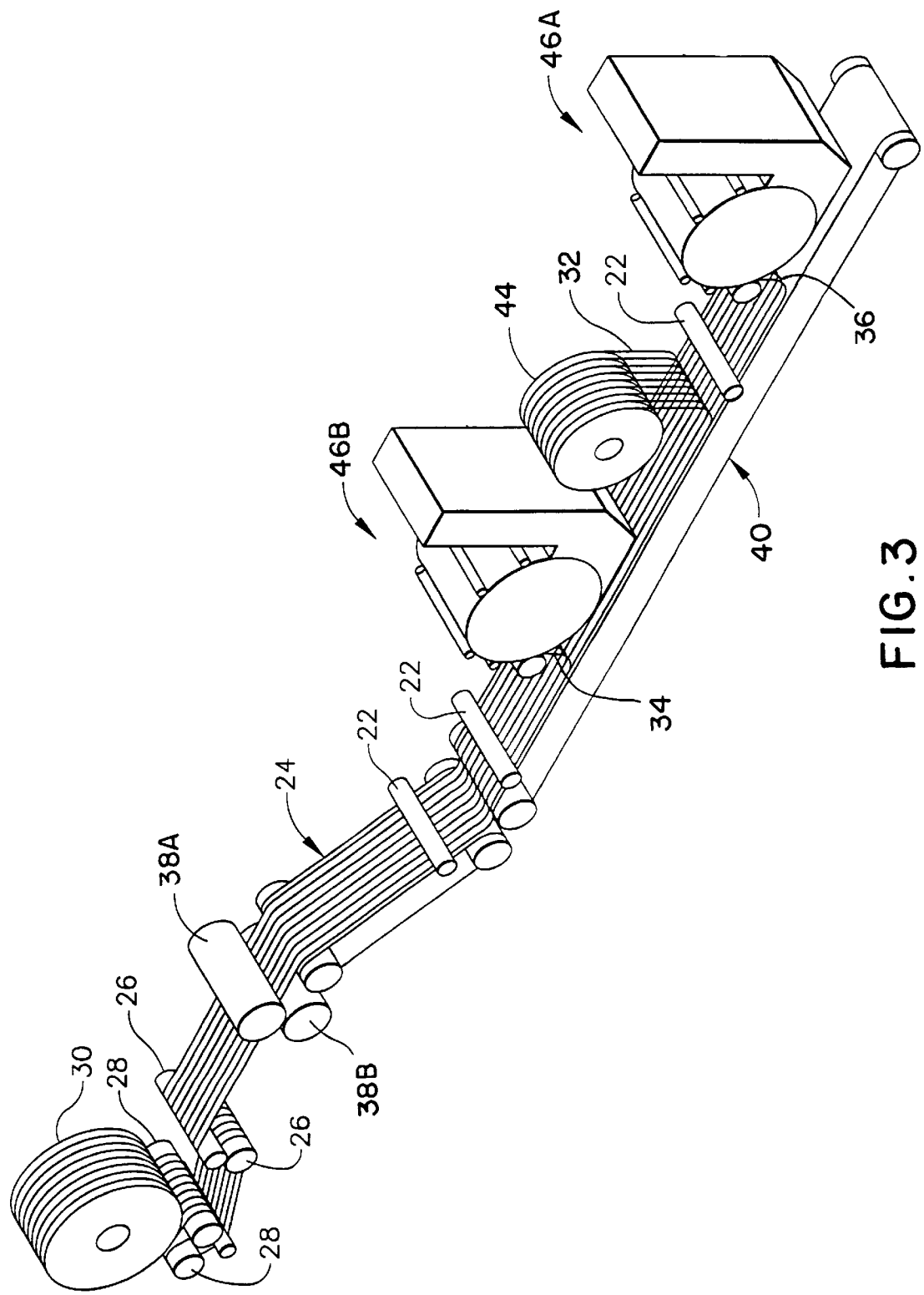
FIGS. 3 is a schematic view of a process line using one engraved and one smooth roll for the manufacture of apertured nonwoven bi-laminates in the invention.

In FIG. 3, another type of preferred process line is shown schematically for the manufacture of apertured nonwoven laminate as a continuous roll product. For a bi-laminate product, a carded web 34 or 36 is formed at one of the two carding stations 46A and 46B shown, while a plastic film 32 is unwound from a supply roll 44. For a tri-laminate product, carded webs are formed at both carding stations 46A and 46B. Each carding station is of a conventional type having a hopper with a chute for feeding fibers to an inlet to carding and stripping components, and a doffer and comb for stripping and gently depositing the web of fibers onto a moving card conveyor 40. The sandwich of carded web and plastic film (bi-laminate) or two carded webs and intermediate plastic film (tri-laminate) is advanced on the conveyor 40, with the aid of a plurality of idler rollers 22 and an inclined conveyor 24, to the nip between heated calendar rolls 38A and 38B. One roll may be engraved with bonding points while the other one is smooth, or both rolls may have matched bonding points.

For a bi-laminate product as described herein, it is preferred that the carded web 36 forms the bottom layer 36 and the plastic film 32 form the top layer of the bi-laminate, and the top calendar roll 38A is a smooth roll and the bottom calendar roll 38B is an engraved roll. Depending on the materials used, the calender rolls are heated to a temperature in the range of 200° F.–450° F. The process temperature on the film (top) side is set at least 70° C. lower than the fibrous (bottom) side. The pressure between the top and bottom rolls may be in the range of 100–600 pli, preferably about 250 pli. The line speed may be in the range of 50–600 fpm. Samples were manufactured on a pilot calendar at a line speed of 100 fpm.

The laminate bond pattern on the engraved rolls can have any one of a number of different geometries. The total bonding area can be varied in the range of 5–30%. The engraved calendar rolls are specifically designed to yield the desired stress/strain properties. In the preferred line, the rolls has a repeating 7-point dot pattern of spaced circular lands which form the bond spots. Hence, this process line is referred to as "7-Point Bonding Line".

After being laminated by the calendar rolls 38A and 38B, the laminated fabric passes through a pair of opposing rolls 26 which control the in-wound stretch of the fabric. A spreader roll may be sued to remove wrinkles. The fabric is then wound on a pair of surface winder rolls 28, both of which are driven. The final product is a wound roll 30.

A more detailed description of this process line is provided in commonly owned U.S. patent application Ser. No. 08/705,208 of Srinivasan et al. filed on Aug. 29, 1996, now U.S. Pat. No. 5,851,935 issued Dec. 22, 1998 which is incorporated herein by reference.

Depending on the kind of plastic film used and the type of fiber employed, the fluid handling properties of the apertured nonwoven product can be modified as required for suitable strikethrough, re-wet, liquid distribution, and other properties. Strikethrough may be defined as the time required for a given amount of fluid to pass through an apertured nonwoven product. The less time it takes for the liquid to pass through the apertured nonwoven product the better the strikethrough value. Re-wet may be defined as the amount of fluid which will tend to flow from an absorbent core back toward the outer face of an apertured nonwoven product when the core is completely saturated with fluid. Re-wet is measured in grams and represents the surface dryness. The less fluid to reach the topsheet, the dryer the surface.

The laminate can be formed to possess the desired softness for skin contact in various consumer disposable applications, as measured by hand-feel. However, a trade-off exists between fabric softness and the aperture clarity that is obtained. The elasticity of the apertured structure can be easily altered by using elastomeric materials instead of an olefinic film. Apertured products can be made in almost any weight, e.g., ranging from 10.0 to 90.0 gsy. A typical laminate for consumer disposable applications could be in the range of 35.0 to 55.0 gsy.

In accordance with the present invention, two preferred types of apertured nonwoven laminate are formed for particularly advantageous applications, one as a baby wipe, and the other as coverstock for a topsheet for hygienic articles, such as sanitary napkins. These two product embodiments are described in further detail below.

Composite Baby Wipe

Wipes, and particularly baby wipes, are typically formed for the needs of a low end and of a high end of the market. The material of choice for a conventional product at the low end is an air-laid nonwoven, whereas the material of choice for the high end is a spunlaced nonwoven. In the present invention, it is desired to produce a baby wipe product that will offer significant cost advantages while delivering equal or better functional performance as conventional high end spunlaced wipe.

An advantageous baby wipe product is formed from a thermally apertured nonwoven tri-laminate made by the Novonette Bonding Line described above. The tri-laminate combines a layer of linear low density polyethylene (LLDPE) as the middle layer between two outer layers of absorbent, resilient, binder fibers, such as polypropylene fibers or fiber blend and rayon fibers. The properties of samples of the tri-laminate product for baby wipes are summarized in the appended Table 5.

From the samples tested, the following observations were made. All of the samples had a substantially lower material and fabrication cost than conventional spunlaced nonwoven used for baby wipes, while delivering comparable functional performance. Overall, the tensile strengths were lower due to the use of the middle film in the formation of the apertured product. Use of low tenacity, high elongation hydrophilic polypropylene fibers (Herculon T111) in the top and bottom layers was found to obtain an increase of 62% in strength in the machine direction and 40% in strength in the cross direction and reduction of 44% in fuzz generation, as compared to using high tenacity, low elongation hydrophilic polypropylene fibers (Herculon T117).

The above samples used the same blend of fibers on both top and bottom layers. Further trials, as summarized in the appended Table 6, were conducted using different matrixes of fibers for the top and bottom layers and different bonding processes. In Sample 1010.3, the top layer was 100% polypropylene fibers, the bottom layer was a blend of 28% polypropylene, 36% polyester, and 36% rayon fibers, and the bonding process was 7-Point. In Sample 1010.5, the top layer was 100% polypropylene fibers, the bottom layer was a blend of 33% polypropylene, 33% polyester, and 33% rayon fibers, and the bonding process was 7-Point. In Sample 1019.1, the top layer was 100% polypropylene fibers, the bottom layer was a blend of 28% polypropylene, 36% polyester, and 36% rayon fibers, and the bonding process was Novonette. All samples used a middle layer of LLDPE film of 0.8 mils caliper, from the EMB 685 series obtained from Exxon Chemical Company, Lake Zurich, Ill., having COF of 1.13, MD tensile strength of 1,648 ppsi, MD elongation of 490%, CD tensile strength of 956 psi, and CD elongation of 546%.

TABLE 5

| MATERIAL COMPOSITION AND PROPERTIES | L4 1007.2 | L4 1007.3 | L4 1003 |
|---|---|---|---|
| CALENDER PATTERN | 7-POINT | 7-POINT | 7-POINT |
| TOP LAYER | 50% Herculon ® T117 polypropylene 2.0 dbf × 38 mm+ 50% Courtaulds 18453 Rayon 1.5 dpf × 40 mm | 50% Herculon ® T111 polypropylene 2.6 dpf × 38 mm+ 50% Courtaulds 14561 Rayon 2.0 dpf × 40 mm | 25% Herculon ® T111 polypropylene 2.6 dpf × 38 mm+ 25% Wellman Fortrel ® Type 472 polyester 1.5 dpf × 38 mm+ 50% Courtaulds 14561 Rayon 2.0 dpf × 40 mm |

TABLE 5-continued

| MATERIAL COMPOSITION AND PROPERTIES | L4 1007.2 | L4 1007.3 | L4 1003 |
|---|---|---|---|
| MIDDLE LAYER | EMB 685, LLDPE 0.8 mils film, white | EMB 685, LLDPE 0.8 mils film, white | EMB 685, LLDPE 0.8 mils film, white |
| BOTTOM LAYER | 50% Herculon ® T117 polypropylene 2.0 dpf × 38 mm+ 50% Courtaulds 18453 Rayon 1.5 dpf × 40 mm | 50% Herculon ® T111 polypropylene 2.6 dpf × 38 mm+ 50% Courtaulds 14561 Rayon 2.0 dpf × 40 mm | 25% Herculon ® T111 polypropylene 2.6 dpf × 38 mm+ 25% Wellman Fortrel ® Type 472 polyester 1.5 dpf × 38 mm+ 50% Courtaulds 14561 Rayon 2.0 dpf × 40 mm |
| Total weight, gsy | 50.80 | 54.20 | 52.50 |
| Caliper, mils | 23.10 | 25.50 | 25.60 |
| Absorbency - Basket Sink | | | |
| Absorbency, gm/gm | 11.49 | 11.05 | 12.67 |
| Sinktime, secs | 3.00 | 5.21 | 4.31 |
| Dry Strip properties: | | | |
| MD dry tensile, gms/in | 1.173.00 | 1,904.00 | 1,392.00 |
| MD dry elongation, % | 17.80 | 39.40 | 36.10 |
| CD dry tensile, gms/in | 438.80 | 616.20 | 481.40 |
| CD dry elongation, % | 68.10 | 64.10 | 72.30 |
| Wet Strip properties: | | | |
| MD wet tensile, gms/in | 1,264.00 | 2,116.00 | 1,508.00 |
| MD wet elongation, % | 22.50 | 41.90 | 39.70 |
| CD wet tensile, gms/in | 471.50 | 628.00 | 498.40 |
| CD wet elongation, % | 78.30 | 69.00 | 69.80 |
| Fuzz (dry sample), mgs | 28.30 | 15.80 | 24.40 |

TABLE 6

| MATERIAL COMPOSITION AND PROPERTIES | L4 1010.3 | L4 1010.5 | L4 1019.1 |
|---|---|---|---|
| CALENDER PATTERN | 7-POINT | 7-POINT | NOVONETTE #2 |
| TOP LAYER | 100% Herculon ® T117 polypropylene 2.0 dpf × 38 mm | 100% Herculon ® T117 polypropylene 2.0 dpf × 38 mm | 100% Herculon ® T116 polypropylene 2.0 dpf × 38 mm |
| MIDDLE LAYER | EMB 685, LLDPE 0.8 mils film, white | EMB 685, LLDPE 0.8 mils film, white | EMB 685, LLDPE 0.8 mils film, white |
| BOTTOM LAYER | 28% Herculon ® T117 polypropylene 2.0 dpf × 38 mm+ 36% Wellman Fortrel ® Type 472 polyester 1.5 dpf × 38 mm+ 36% Courtaulds 14561 Rayon 2.0 dpf × 40 mm | 33% Herculon ® T117 polypropylene 6.0 dpf × 38 mm+ 33% Hoechst-Celanese Type 224 polyester 16.0 dpf × 38 mm+ 33% Courtaulds 20762 Rayon 5.5 dpf x0 40 mm | 33% Herculon ® T117 polypropylene 2.0 dpf × 38 mm+ 33% Wellman Fortrel 200 Type 472 polyester 1.5 dpf × 38 mm+ 33% Courtaulds 18453 Rayon 1.5 dpf × 40 mm |
| Total weight, gsy | 55.60 | 60.60 | 47.60 |
| Caliper, mils | 23.40 | 32.00 | 25.30 |
| Absorbency - Basket Sink | | | |
| Absorbency, gm/gm | 10.52 | 12.81 | 12.58 |
| Sinktime, secs | 2.81 | 2.92 | 3.54 |
| Dry Strip properties: | | | |
| MD dry tensile, gms/in | 1,374.00 | 935.50 | 1,132.00 |
| MD dry elongation, % | 14.20 | 13.20 | 19.20 |
| CD dry tensile, gms/in | 426.50 | 378.80 | 218.70 |
| CD dry elongation, % | 80.50 | 58.50 | 54.50 |
| Wet Strip properties: | | | |
| MD wet tensile, gms/in | 1,414.00 | 1,001.00 | 1.173.00 |
| MD wet elongation, % | 16.80 | 14.20 | 21.60 |

TABLE 6-continued

| MATERIAL COMPOSITION AND PROPERTIES | L4 1010.3 | L4 1010.5 | L4 1019.1 |
|---|---|---|---|
| CD wet tensile, gms/in | 453.00 | 415.40 | 243.50 |
| CD wet elongation, % | 69.70 | 54.10 | 54.10 |
| Fuzz (dry sample), mgs | 28.40 | 39.10 | 4.50 |

The tri-laminate layered with different top and bottom layers also obtained comparable results to commercially available high-end baby wipes. Also, the samples took on a unique texture and appearance in a wet condition (in the presence of baby lotion) which gave the baby wipes of this invention a superior aesthetic look to conventional baby wipes. The presence of a polymeric material middle layer increases the opacity of the wipe substrate. Further, the apertures render enhanced drapeability to the wipe substrate resulting in the wipe conforming nicely to the user's hand as well as the surface being wiped. Moreover, the non-apertured regions possess outwardly protruding fibers, making these areas somewhat lofty. This combination of attributes also increases the cleaning efficiency of the wipe substrate.

Use of the Novonette Bonding Line with top and bottom engraved calendar rolls having 25% bond area obtained an 85–88% reduction in fuzz generation, as compared to the 7-Point Bonding Line using one engraved calendar roll with 19% bond area and a smooth opposing roll. The samples in Tables 5 and 6 were produced at calendar pressures varying from 100 to 800 pli, with a preferred pressure of 250 pli. The temperatures of both the top and bottom rolls varied from 200–500° F., with the preferred range being 300–400° F.

Apertured Coverstock For Topsheet For Sanitary Napkin

A coverstock used as a topsheet for a hygienic article, such as a sanitary napkin, is typically a nonwoven material or laminate that has its outer side placed in contact with the skin, and its inner side in direct contact with an absorbent core layer for the hygienic article. The nonwoven used in these commercial products is usually hydrophilic carded thermal bond or a hydrophilic spunbond.

Extensive field testing with customers has indicated that conventional coverstocks did not possess adequate fluid penetration for bodily fluids, such as menstrual fluids, although they delivered the required re-wet properties. Feminine sanitary napkins are either full size napkins or panty shields. Full size napkins are used by women during menstruation to absorb menstrual fluid during a three to five day period. Some popular full sized napkins available commercially have used an apertured film with an open area of 7–10% as the topsheet in contact with the skin. Apertured nonwovens made by other processes like spunlacing can be used in lieu of apertured film topsheets, but they are very expensive and do not keep the skin surface dry. It is estimated that commercial full sized sanitary napkins have a high failure rate, as measured by undergarment staining, in the range of 40–65%. Thus, it is desired to have an apertured coverstock which can keep the skin dry, yet can perform better to pass menstrual fluids quickly through to the absorbent core.

Figure 4A:
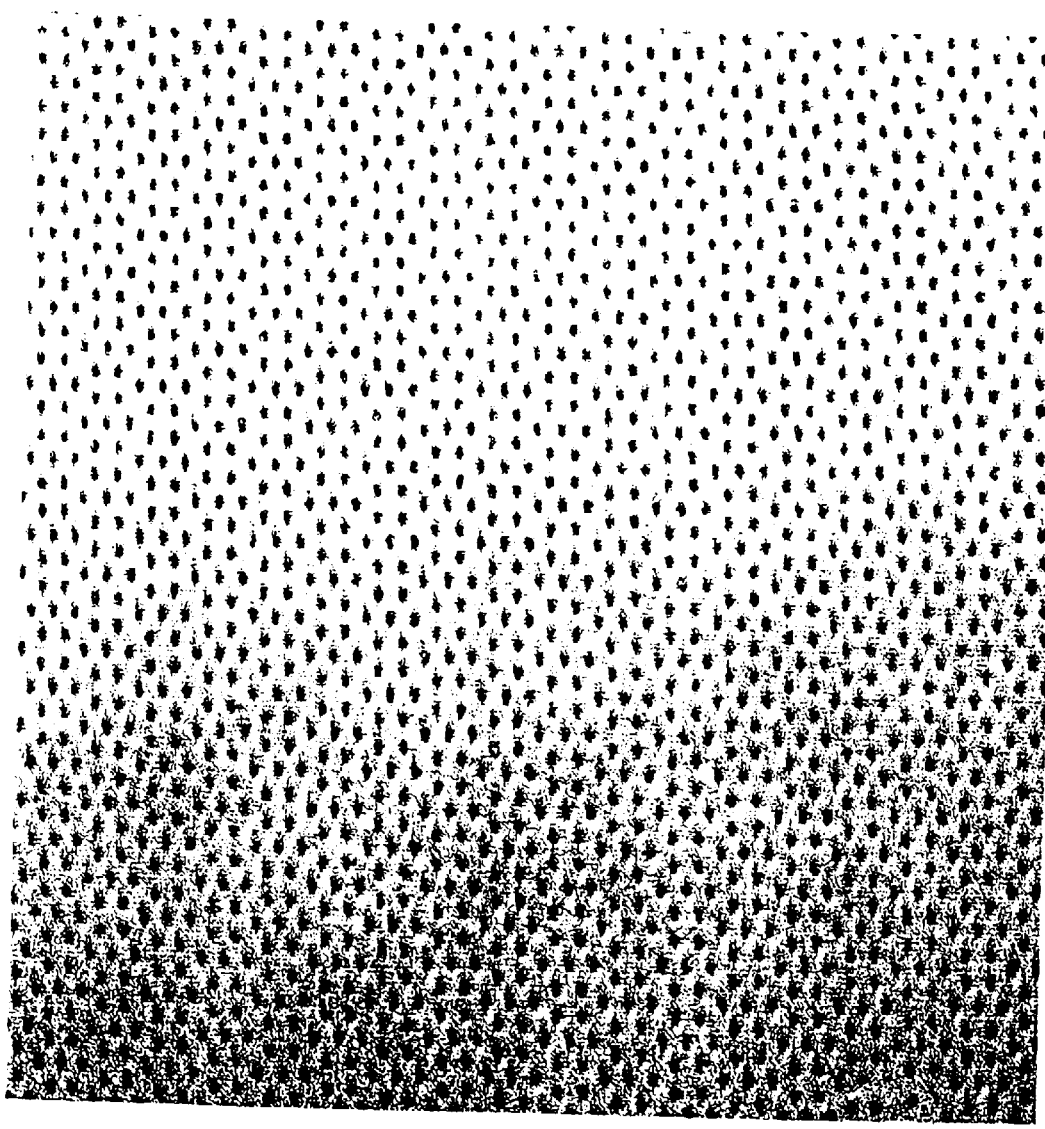
FIG. 4A shows the top (film) side of a preferred bi-laminate product in the invention.
Figure 4B:
FIG. 4B is a schematic drawing showing the partial aperturing of the fibrous side of the bi-laminate product.

In the present invention, a bi-laminate film-fiber apertured laminate is formed with complete aperturing and a high degree of open area in the range of about 25% on the film (top) side, and partially aperturing on the fiber (bottom) side, obtained by using a smooth top roll and engraved bottom roll in the 7-Point Bonding Line previously described. The complete aperturing and 25% open area at the top side allows ready passage of bodily fluid through the coverstock, while the partial aperturing on the bottom side increases contact of loose fiber ends with the core layer and reduces re-wetting on the coverstock surface. FIG. 4A is a photograph showing the apertured coverstock on its film (top) side, and FIG. 4B is a schematic sectional view showing the partial aperturing on the fibrous side.

The film material is selected to have the properties of melting at a temperature of at least 35° C. lower than the fibers of the bottom layer and, under calendar heat and pressure, of shrinking suddenly so as to pull the fibers on the other side away from the calendar points of the lower calendar roll. The top roll at the film side is set to a temperature at least 70° C. (126° F.) lower than the temperature at the fibrous side. This prevents the melting film from liquefying and sticking to the top roll. The use of calendar points on only the engraved bottom roll allows some of the fiber ends of the bottom fibrous layer to remain somewhat loose after calendaring in order to create the desired partial aperturing effect.

In the preferred bi-laminate product, the fibers of the bottom layer are a blend of 36% polypropylene, 28% polyethylene, and 36% rayon fibers, while the top layer is LLDPE film material of 0.80 mils caliper, from the EMB 685 series obtained from Exxon Chemical Company. The formation of partial apertures on the fibrous side is aided by the use of high tenacity, low elongation polypropylene fibers (Herculon T117). A crusted ring of fused matter is created along the periphery of each opening. The apertures are circular or oval and, preferably, have an area of about $2.2 \times 10^{-3}$ sq.in., with about 115 apertures per square inch, for an open area of about 25% of the surface area. The process conditions and properties of a preferred fabric are summarized in Table 7.

TABLE 7

| MATERIAL COMPOSITION | L4 1010.4 |
|---|---|
| TOP LAYER | EMB 685 White |
|  | 0.8 mils film |
| BOTTOM LAYER | 36% 472 PET |
|  | 1.5 dpf × 38 mm+ |
|  | 36% 14561 Rayon |
|  | 2.0 dpf × 40 mm+ |
|  | 28% T117PP |
|  | 2.0 dpf × 38 mm |
| Process parameters: |  |
| Surface: Top/Bottom, ° F. | 373/300 |
| Weight, gsy | 39.00 |
| Caliper, mils | 19.60 |
| Animal blood strikethrough, secs | 8.79 |
| Rewet, gms | 0.17 |

TABLE 7-continued

| MATERIAL COMPOSITION | L4 1010.4 |
|---|---|
| DRY TENSILES: | |
| MD tensile, g/in | 755.70 |
| MD elongation, % | 18.00 |
| CD tensile, g/in | 311.40 |
| CD elongation, % | 113.00 |
| WET TENSILES: | |
| MD tensile, g/in | 813.00 |
| MD elongation, % | 22.00 |
| CD tensile, g/in | 330.00 |
| CD elongation, % | 98.00 |

The resulting bi-laminate is a two-sided coverstock having an apertured, smooth, and quilted appearance on the top side, with the bottom side being resilient and fibrous and forming an excellent acquisition and distribution layer for the coverstock. The coverstock has an extremely soft feel overall and is very drapeable. It is ideally suited for use as a topsheet in hygienic/absorbent products. On a per weight basis, some films are cheaper than the fiber used. Therefore, in some cases, the cost of making the apertured fabric is significantly less than making a conventional apertured fabric of comparable weight using fibers alone. The fiber make-up of the bottom layer can be varied to satisfy the required fluid handling, surface dryness, and comfort characteristics desired. Other film materials having the pronounced heat shrinking property as described previously may also be used.

The fluid handling properties of the apertured nonwoven coverstock have been evaluated using the strikethrough and dryness test method widely known in the absorbent products industry. The fluid used is animal blood. In the strikethrough test, the time required for a given amount of fluid to pass through the coverstock in seconds is the strikethrough time. The less time it takes for the test fluid to pass through, the better the strikethrough value. The re-wet test measures the amount of fluid (in grams) which will tend to flow from the core back towards the outer face of the topsheet when the core is completely saturated with test fluid. The less amount of fluid that flows back to the coverstock, the dryer the surface. Trials were conducted using five 5"×5" filter papers as the core material. The preferred coverstock product was tested against 6 popular commercial brands, with the results shown in Table 8.

TABLE 8

| SAMPLE | STRIKETHROUGH | REWET | COMMENTS |
|---|---|---|---|
| Invention L4 1010.4 | 8.79 | 0.19 | Lowest rewet |
| Brand #1 | 13.56 | 0.33 | |
| Brand #2 | 8.68 | 1.74 | |
| Brand #3 | 8.71 | 0.95 | |
| Brand #4 | 3.17 | 1.38 | Best strikethru |
| Brand #5 | 5.16 | 1.22 | |
| Brand #6 | 9.75 | 1.08 | |

The comparative tests showed that the film-fiber apertured coverstock with 25% open area had the lowest re-wet measure, hence the driest surface when the core was saturated. Its strikethrough time was in the median range compared to the other conventional brands tested. The bi-laminate coverstock product therefore provide significant cost savings while providing comparable performance to the conventional brands.

Although the invention has been described with reference to certain preferred processes and examples, it will be appreciated that many other variations and modifications thereof may be devised in accordance with the principles disclosed herein. The invention and all such variations and modifications thereof within the scope and spirit of the invention are defined in the following claims.

We claim:

1. An apertured nonwoven laminate for wipes comprising a carded web of fibers having a first melting temperature and a polymeric sheet having a second melting temperature lower than said first melting temperature and a property of shrinking under application of heat, said carded web of fibers and polymeric sheet being calendered by heated calendering points of a calender roll, such that said polymeric sheet becomes bonded to said fibers and pulls said fibers away from said calendering points, thereby generating apertures through the laminate.

2. A laminate according to claim 1, wherein said carded web of fibers and polymeric sheet are calendered by heated calendering points of two calender rolls on opposing sides of the laminate.

3. A laminate according to claim 1, wherein said fibers are polypropylene fibers having high tenacity and low elongation characteristics.

4. A laminate according to claim 1, wherein said polymeric sheet is selected from the group consisting of an olefinic material with EVA copolymer, olefinic material with polystyrenic blends, an elastomeric material, and a heat shrink material.

5. A laminate according to claim 4, wherein said polymeric sheet is a linear low density polyethylene film.

6. A laminate according to claim 1 formed as a tri-laminate having two outer carded webs and an intermediate polymeric sheet sandwiched therebetween.

7. A laminate according to claim 6, wherein said outer carded webs comprise polypropylene fibers having high tenacity and low elongation characteristics, and said polymeric sheet comprises a linear low density polyethylene film.

8. A laminate according to claim 6, wherein the two outer carded webs are made of the same fibrous material.

9. A laminate according to claim 6, wherein the two outer carded webs are made of different fibrous material.

10. A laminate according to claim 9, wherein one outer carded web is made of high tenacity, low elongation polypropylene fibers, and the other carded web is made of a blend of polypropylene, polyester, and rayon fibers.

11. A laminate according to claim 1, wherein the laminate has a weight in the range of 10 to 90 gsy.

12. A laminate according to claim 1, wherein each of the apertures is defined by a crusted ring of fused matter along the periphery thereof.

13. An apertured nonwoven laminate for coverstock for hygienic articles comprising a carded web of fibers having a first melting temperature on a top side thereof and a polymeric sheet having a second melting temperature lower than said first melting temperature and a property of shrinking under application of heat on an inner side thereof, said carded web of fibers and polymeric sheet being calendered by heated calendering points of a calender roll, such that said polymeric sheet becomes bonded to said fibers and pulls said fibers away from said calendering points, thereby generating apertures through the laminate.

14. A laminate according to claim 13, wherein the second melting temperature of said polymeric sheet is at least 35° C. lower than the first melting temperature of said fibers.

15. A laminate according to claim 13, wherein said fibers are a blend of polypropylene, polyethylene, and rayon fibers.

16. A laminate according to claim 15, wherein said polypropylene fibers have high tenacity and low elongation characteristics.

17. A laminate according to claim 13, wherein said polymeric sheet is selected from the group consisting of an olefinic material with EVA copolymer, olefinic material with polystyrenic blends, an elastomeric material, and a heat shrink material.

18. A laminate according to claim 17, wherein said polymeric sheet is a linear low density polyethylene film.

19. A laminate according to claim 13 wherein said polymeric sheet has complete apertures formed therethrough and said carded web of fibers has partial apertures formed therethrough by calendering with a smooth calendar roll at the top side and an engraved calender roll at the inner side thereof.

20. A laminate to claim 13, wherein said laminate has an open area of about 25% at the top side thereof, and a property of low re-wetting of about 0.19 grams according to a standard re-wet test.

* * * * *